US008629788B1

(12) United States Patent
Greenleaf et al.

(10) Patent No.: US 8,629,788 B1
(45) Date of Patent: Jan. 14, 2014

(54) SENSING, DISPLAY, AND DISSEMINATION OF DETECTED TURBULENCE

(75) Inventors: William T. Greenleaf, Indialantic, FL (US); Richard S. Dove, Palm Bay, FL (US); Scott F. Bauler, Melbourne, FL (US); Randy H. Jacobsen, Melbourne, FL (US); Kirschen A. Seah, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 515 days.

(21) Appl. No.: 12/853,622

(22) Filed: Aug. 10, 2010

(51) Int. Cl.
*G08B 23/00* (2006.01)

(52) U.S. Cl.
USPC .......... 340/968; 340/539.28; 340/539.26; 340/539.13; 340/572.1; 340/601; 340/602; 340/946; 340/945; 340/963; 244/24; 244/116; 342/26 B; 342/26 R; 342/450; 455/431; 701/2; 701/3; 701/9; 701/10; 701/14; 701/409

(58) Field of Classification Search
USPC ........ 340/945, 946, 601, 602, 572.1, 539.13, 340/539.26, 539.28, 968, 963; 244/24, 116; 342/26 B, 26 R, 450; 455/431; 701/2, 3, 701/9, 10, 14, 409
See application file for complete search history.

(56) References Cited

U.S. PATENT DOCUMENTS

| | | | | |
|---|---|---|---|---|
| 2,309,584 A | * | 1/1943 | George | 244/1 A |
| 2,638,590 A | * | 5/1953 | Field | 342/450 |
| 3,436,035 A | * | 4/1969 | Priestley | 244/193 |
| 3,465,339 A | * | 9/1969 | Marner | 374/122 |
| 5,123,615 A | * | 6/1992 | Wagner et al. | 244/116 |
| 5,541,591 A | * | 7/1996 | Bush | 340/968 |
| 5,687,930 A | * | 11/1997 | Wagner et al. | 244/116 |
| 5,912,627 A | * | 6/1999 | Alexander | 340/815.4 |
| 6,347,263 B1 | * | 2/2002 | Johnson et al. | 701/14 |
| 6,456,226 B1 | * | 9/2002 | Zheng et al. | 342/26 R |
| 6,501,392 B2 | * | 12/2002 | Gremmert et al. | 340/971 |
| 6,691,004 B2 | * | 2/2004 | Johnson et al. | 701/14 |
| 6,917,297 B2 | * | 7/2005 | Andrews et al. | 340/601 |
| 6,931,247 B2 | * | 8/2005 | Cox et al. | 455/431 |
| 6,944,450 B2 | * | 9/2005 | Cox | 455/431 |
| 6,963,291 B2 | * | 11/2005 | Holforty et al. | 340/945 |
| 7,124,022 B2 | * | 10/2006 | Carmichael et al. | 701/409 |
| 7,164,366 B2 | * | 1/2007 | Delaplace et al. | 340/945 |
| 7,183,946 B2 | * | 2/2007 | Boudrieau | 340/945 |
| 7,196,621 B2 | * | 3/2007 | Kochis | 340/539.13 |
| 7,218,227 B2 | * | 5/2007 | Davis et al. | 340/572.1 |
| 7,228,210 B2 | * | 6/2007 | Davis et al. | 701/32.4 |
| 7,271,741 B2 | * | 9/2007 | Delaplace et al. | 340/945 |
| 7,301,454 B2 | * | 11/2007 | Seyfang et al. | 340/539.26 |
| 7,358,862 B2 | * | 4/2008 | Andersson et al. | 340/870.1 |
| 7,382,283 B2 | * | 6/2008 | Delaplace et al. | 340/945 |
| 7,383,104 B2 | * | 6/2008 | Ishii et al. | 701/3 |
| 7,463,955 B1 | * | 12/2008 | Robinson et al. | 701/3 |
| 7,471,995 B1 | * | 12/2008 | Robinson | 701/3 |

(Continued)

*Primary Examiner* — George Bugg
*Assistant Examiner* — Paul Obiniyi
(74) *Attorney, Agent, or Firm* — Donna P. Suchy; Daniel M. Barbieri

(57) ABSTRACT

A system may include a sensor for coupling with a vehicle configured for atmospheric flight. The sensor may be configured for detecting a turbulence event, where the turbulence event is at least one of experienced by the vehicle or occurs proximal to the vehicle during atmospheric flight. The system may also include a transmitter coupled with the sensor. The transmitter may be configured for automatically remotely transmitting data regarding the turbulence event to a ground based entity.

16 Claims, 3 Drawing Sheets

(56) References Cited

U.S. PATENT DOCUMENTS

| | | | |
|---|---|---|---|
| 7,515,088 B1* | 4/2009 | Woodell et al. | 342/26 B |
| 7,612,688 B1* | 11/2009 | Vigeant-Langlois et al. | 340/971 |
| 7,724,177 B2* | 5/2010 | Bunch et al. | 342/26 R |
| 7,747,360 B2* | 6/2010 | Canu-Chiesa et al. | 701/3 |
| 7,774,105 B2* | 8/2010 | Robb et al. | 701/3 |
| 7,912,594 B2* | 3/2011 | Gremmert | 701/9 |
| 7,917,255 B1* | 3/2011 | Finley | 701/9 |
| 7,932,837 B2* | 4/2011 | Giesa et al. | 340/945 |
| 8,130,121 B2* | 3/2012 | Smith et al. | 340/945 |
| 8,131,407 B1* | 3/2012 | Robinson | 701/3 |
| 8,131,408 B2* | 3/2012 | Kordt | 701/3 |
| 8,144,048 B2* | 3/2012 | Bunch et al. | 342/26 B |
| 8,159,369 B1* | 4/2012 | Koenigs et al. | 340/963 |
| 8,203,465 B2* | 6/2012 | Shafaat et al. | 340/971 |
| 2001/0039189 A1* | 11/2001 | Cox | 455/431 |
| 2001/0056316 A1* | 12/2001 | Johnson et al. | 701/14 |
| 2002/0030610 A1* | 3/2002 | Ishihara et al. | 340/970 |
| 2002/0036574 A1* | 3/2002 | Ishihara | 340/945 |
| 2002/0039072 A1* | 4/2002 | Gremmert et al. | 340/945 |
| 2002/0075170 A1* | 6/2002 | Schwinn et al. | 340/945 |
| 2002/0089432 A1* | 7/2002 | Staggs et al. | 340/945 |
| 2002/0163446 A1* | 11/2002 | Schwinn et al. | 340/945 |
| 2003/0040854 A1* | 2/2003 | Rendahl et al. | 701/29 |
| 2004/0049729 A1* | 3/2004 | Penfield | 715/503 |
| 2004/0100395 A1* | 5/2004 | Anderson | 340/945 |
| 2004/0148088 A1* | 7/2004 | Davis et al. | 701/123 |
| 2004/0244476 A1* | 12/2004 | Andrews et al. | 73/170.01 |
| 2004/0246145 A1* | 12/2004 | Andrews et al. | 340/971 |
| 2005/0028214 A1* | 2/2005 | Hall | 725/105 |
| 2005/0118952 A1* | 6/2005 | Cox et al. | 455/62 |
| 2005/0156751 A1* | 7/2005 | Seyfang et al. | 340/693.1 |
| 2005/0173590 A1* | 8/2005 | Andersson et al. | 244/24 |
| 2005/0174235 A1* | 8/2005 | Davis et al. | 340/539.13 |
| 2006/0111818 A1* | 5/2006 | Ishii et al. | 701/3 |
| 2006/0187026 A1* | 8/2006 | Kochis | 340/539.13 |
| 2006/0238384 A1* | 10/2006 | Hess et al. | 340/995.14 |
| 2007/0273556 A1* | 11/2007 | Gyde et al. | 340/945 |
| 2008/0030375 A1* | 2/2008 | Cotton et al. | 340/945 |
| 2008/0068220 A1* | 3/2008 | Giesa et al. | 340/945 |
| 2008/0117858 A1* | 5/2008 | Kauffman | 370/316 |
| 2009/0077626 A1* | 3/2009 | Leclercq et al. | 726/1 |
| 2009/0204277 A1* | 8/2009 | Coulmeau et al. | 701/3 |
| 2009/0315704 A1* | 12/2009 | Rosing et al. | 340/539.13 |
| 2010/0245167 A1* | 9/2010 | Bunch et al. | 342/26 B |
| 2011/0006918 A1* | 1/2011 | Shafaat et al. | 340/945 |
| 2011/0050458 A1* | 3/2011 | Bailey et al. | 340/901 |

* cited by examiner

106 SENSOR
- 108 ALTITUDE HEADING REFERENCE SYSTEM
- 110 INERTIAL REFERENCE SYSTEM
- 112 INERTIAL NAVIGATION SYSTEM
- 114 ANGLE OF ATTACK SENSOR
- 116 WEATHER RADAR
- 118 CLOUD COVER SENSOR

FIG. 2

104 GROUND-BASED AUTHORITY
- 138 WEATHER FACILITY
- 140 REPEATER
- 142 CONTROL TOWER
- 148 AIR TRAFFIC FACILITY
- 150 RECEIVER

FIG. 3

SENSING, DISPLAY, AND DISSEMINATION OF DETECTED TURBULENCE

TECHNICAL FIELD

The present disclosure generally relates to the field of meteorological data collection and more particularly to systems and a computer program product for collecting turbulence information and automatically remotely reporting to a ground-based authority.

BACKGROUND

An aircraft may include a variety of sensors capable of detecting turbulence and reporting information regarding the turbulence to the pilot of the aircraft. However, this turbulence information is often not forwarded by the pilot to authorities on the ground, or it may be forwarded in a very subjective and ad-hoc manner.

SUMMARY

A system may include a sensor for coupling with a vehicle configured for atmospheric flight. The sensor may be configured for detecting a turbulence event, where the turbulence event is at least one of experienced by the vehicle or occurs proximal to the vehicle during atmospheric flight. The system may also include a transmitter coupled with the sensor. The transmitter may be configured for automatically remotely transmitting data regarding the turbulence event to a ground based entity.

A system may include a transmitter for coupling with a sensor, the transmitter for automatically remotely transmitting data regarding a turbulence event to a ground based entity. The sensor may be coupled with a vehicle configured for atmospheric flight. The sensor may be configured for detecting the turbulence event, where the turbulence event is at least one of experienced by the vehicle or occurs proximal to the vehicle during atmospheric flight. The system may also include control programming for distinguishing the turbulence event from a non-turbulence event.

A computer program product may include a recordable-type signal bearing medium bearing computer usable code configured for receiving notification of a turbulence event, where the turbulence event is at least one of experienced by a vehicle configured for atmospheric flight or occurs proximal to the vehicle during atmospheric flight. The computer program product may also include a recordable-type signal bearing medium bearing computer usable code configured for distinguishing the turbulence event from a non-turbulence event. The computer program product may include a recordable-type signal bearing medium bearing computer usable code configured for automatically remotely transmitting data regarding the turbulence event to a ground based entity.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 2 is a schematic illustrating various sensors for utilization with the system illustrated in FIG. 1;

FIG. 3 is a schematic illustrating various ground-based authorities for utilization with the system illustrated in FIG. 1.

DETAILED DESCRIPTION

Figure 1:
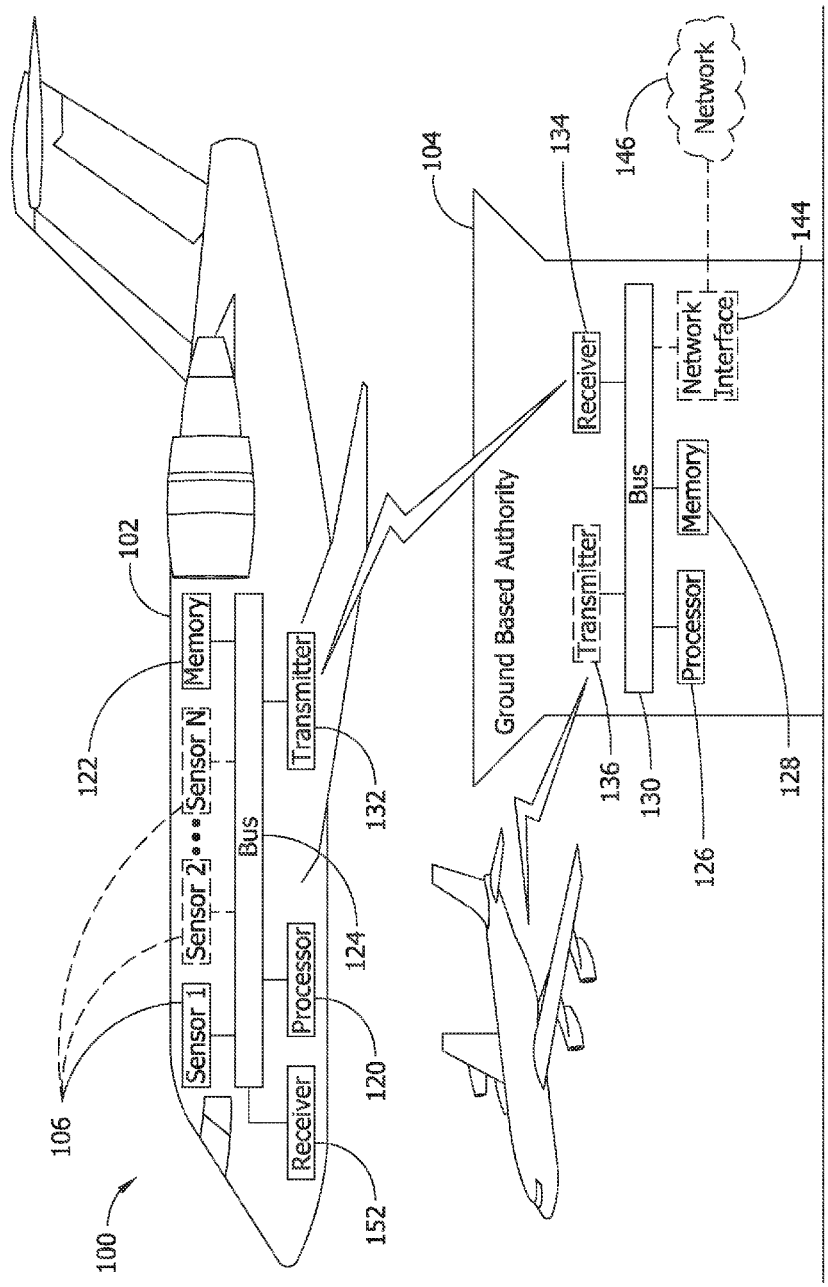
FIG. 1 is a schematic illustrating a system for detecting turbulence via an aircraft sensor and automatically remotely reporting the turbulence to a ground-based authority.

Reference will now be made in detail to the subject matter disclosed, which is illustrated in the accompanying drawings.

Referring generally to FIGS. 1 through 4, a system 100 for automatically remotely transmitting information regarding turbulence and/or a turbulence event from a vehicle configured for atmospheric flight (e.g., aircraft 102) to a ground based entity 104 is described in accordance with the present disclosure. The system 100 may include one or more sensors 106 coupled with the vehicle for detecting a turbulence event, where the turbulence event is at least one of experienced by the vehicle or occurs proximal to the vehicle during atmospheric flight.

For the purposes of the present disclosure, turbulence may be defined as chaotic changes and/or agitation in the atmospheric circulation of fluid air traversed by the aircraft 102 or within range of the sensors 106. For instance, clear air turbulence is one specific kind of turbulence that may be experienced by the aircraft 102, such as when it flies through a region of warm air and cold air mixed together by wind, or the like.

In embodiments, a sensor 106 may include any type of reactive detecting device, measuring device, or other type of instrumentation capable of detecting, measuring, or otherwise indicating the presence of turbulence or a turbulence event as experienced by the aircraft 102. For example, in one embodiment, the sensor 106 may include an Attitude Heading Reference System (AHRS) 108. The AHRS AHR may be utilized to detect a turbulence event (and possibly its severity) by measuring acceleration utilizing accelerometers arranged along three orthogonal axes. In another embodiment, the sensor 106 may include an Inertial Reference System (IRS) 110. In a further embodiment, the sensor 106 may include an Inertial Navigation System (INS) 112. In a specific instance, the sensor 106 includes an angle of attack sensor 114 for detecting a pitch up/pitch down condition while the aircraft 102 maintains a particular altitude. This detected pitch up/pitch down condition may be indicative of turbulence. In this manner, the angle of attack sensor 114 may be utilized to detect turbulence experienced by the aircraft 102.

In other embodiments, a sensor 106 may include any type of predictive detecting device, measuring device, or other type of instrumentation capable of detecting, measuring, or otherwise indicating the presence of turbulence or a turbulence event proximal to the aircraft 102 or its flight path, while not necessarily experienced by the aircraft 102 itself. For the purposes of the present disclosure, turbulence or a turbulence event proximal to the aircraft 102 may be defined as turbulence predictable within a range detectable by the sensor 106. For example, the sensor 106 may be utilized to predict turbulence some distance away from the aircraft.

In embodiments, the sensor 106 may include radar, such as weather radar 116, capable of distinguishing between ride-quality and severe turbulence. In a specific instance, the weather radar 116 may have turbulence detection implemented by detecting and interpreting the motion of hydrometeors, such as rain, or the like. In embodiments, rain droplets moving in generally the same direction may be indicative of non-turbulent atmospheric conditions for a particular region, while rain droplets moving in many different directions may be indicative of turbulent atmospheric conditions. The velocity of the rain droplets may be determined by the weather radar 116 utilizing the Doppler Effect, or the like. In other embodiments, the relative motion of dust particles may be analyzed by the weather radar 116 to determine wind shear, which may be further correlated to turbulence. In other embodiments, the sensor 106 may include a cloud cover sensor 118. In one specific embodiment, the cloud cover sensor 118 may be implemented as an optical sensor; while in another embodiment, the cloud cover sensor 118 may be implemented as a radar sounder, or the like.

The aircraft 102 may include instrumentation for distinguishing a turbulence event from a non-turbulence event. For example, a specific turbulence event of a particular magnitude may cause different acceleration for a heavier aircraft than for a lighter aircraft. In embodiments, the sensor 106 may be coupled with a processor 120 and/or a memory 122 via a bus 124. The memory 122 (and possibly the processor 120) may be utilized to store one or more characteristics regarding the aircraft 102 (e.g., the weight of the aircraft), and the processor 120 may be utilized to analyze the turbulence event and determine its significance with regard to the one or more characteristics regarding the aircraft 102. For example, an acceleration of a particular magnitude for a heavy aircraft may be interpreted differently with regard to turbulence than the same acceleration for a lighter aircraft. Depending on the determined significance of the turbulence event it may or may not be transmitted to the ground based authority 104.

Alternatively, the ground based authority 104 may include instrumentation for distinguishing a turbulence event from a non-turbulence event. In embodiments, the ground based authority 104 may include a processor 126 and/or a memory 128 coupled via a bus 130. The memory 128 (and possibly the processor 126) may be utilized to store one or more characteristics regarding the aircraft 102 (e.g., the weight of the aircraft), and the processor 126 may be utilized to analyze the turbulence event and determine its significance with regard to the one or more characteristics regarding the aircraft 102. For example, an acceleration of a particular magnitude for a heavy aircraft may be interpreted differently with regard to turbulence than the same acceleration for a lighter aircraft. Depending on the determined significance of the turbulence event it may or may not be stored or marked as authoritative by the ground based authority 104.

In embodiments, the processor 120 and/or the memory 122 of the aircraft 102, and/or the processor 126 and/or the memory 128 of the ground based authority 104 may be utilized for checking one or more turbulence events for consistency, such as identifying when a turbulence event may be a statistical outlier. In embodiments, the turbulence event may or may not be transmitted by the aircraft 102, and may or may not be stored or marked as authoritative by the ground based authority 104 based upon a consistency check. One instance in which a consistency check may identify a statistical outlier may include an instrument malfunction.

The aircraft 102 may include a transmitter 132 for automatically remotely transmitting information regarding turbulence and/or a turbulence event to a receiver 134 of the ground based entity 104. The transmitter 132 may be implemented utilizing one or more data links, such as an Ultra High Frequency (UHF) transmitter, a Very High Frequency (VHF) transmitter, a High Frequency (HF) transmitter, a Satellite Communications (SATCOM) system, Automatic Dependent Surveillance-Broadcast (ADS-B) out equipment (e.g., a Mode-S transponder), or the like. The receiver 134 may also be implemented utilizing one or more data links, such as an Ultra High Frequency (UHF) receiver, a Very High Frequency (VHF) receiver, a High Frequency (HF) receiver, a Satellite Communications (SATCOM) system, Automatic Dependent Surveillance-Broadcast (ADS-B) in equipment (e.g., a Traffic Collision Avoidance System (TCAS) II), or the like. In embodiments, the ground based entity 104 may include a weather facility 138, a public/private repeater/rebroadcaster 140, a control tower 142, an air traffic facility 148 (e.g., an approach control, a departure control, and/or a regional control), a private receiver 150 (e.g., an airline operation and/or a meteorological organization), or the like. Further, the ground based entity 104 may include a transmitter 136 for retransmitting the information regarding turbulence to other aircraft, or the like. In embodiments, the ground based entity 104 may transmit turbulence information via the transmitter 136 to a receiver 152 on the aircraft 100. Additionally, the ground based entity 104 may include a network interface 144 for transmitting the information regarding turbulence across a network 146, such as the Internet, an internet, an intranet, an Ethernet, or the like.

In embodiments, the transmitter 132 is configured for automatically remotely transmitting information regarding at least one other event of meteorological significance to the receiver 134 of the ground based entity 104. For example, the transmitter 132 may automatically transmit other information, including wind speed, cloud cover, icing conditions, a humidity condition, a hail condition, a lightning condition, a temperature condition, a weather condition, a pressure condition, or the like.

The transmitter 132 may be further configured for automatically remotely transmitting additional data associated with the turbulence event. The additional data may include time data, location data, altitude data, speed data, heading data, attitude data, body acceleration data, or any other data available on the aircraft that could assist in interpreting the provided information on detected turbulence. Further, at least a portion of the transmitted data may be encrypted. This may be a feature of the data link connecting the aircraft to the ground based authority, and the encryption may be utilized to encrypt the location of the aircraft 102, delocalizing the data and making it less useful for an unauthorized third party. The transmitter and/or the receiver may utilize various techniques for encrypting the data, including a public key/private key encryption scheme, or the like. Further, the transmitter 132 may be configured for automatically remotely transmitting authentication data for verifying that the turbulence data and/or additional information was transmitted by a known good source of data.

In embodiments, the aircraft 102 may include instrumentation 144 connected to the sensor 106 (e.g., via the bus 124) for enunciating the turbulence event (and possibly its significance) to the flight crew, as well as disseminating the information by data link to a ground station. The instrumentation 144 may include a flight deck display, or the like.

Figure 4:
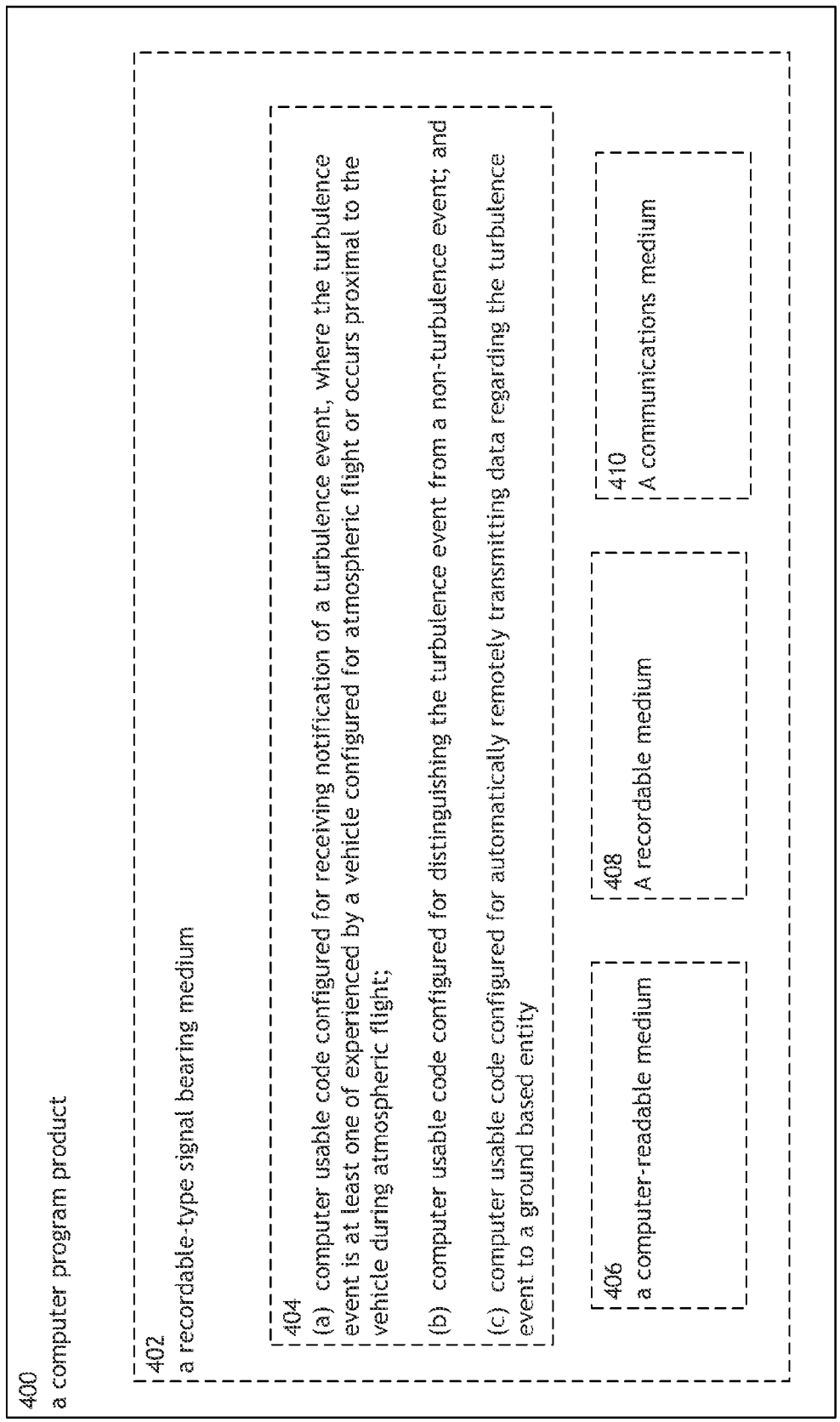
FIG. 4 illustrates a computer program product related to receiving notification of a turbulence event; distinguishing the turbulence event from a non-turbulence event; and automatically remotely transmitting data regarding the turbulence event to a ground based entity

FIG. 4 illustrates a partial view of an example computer program product 400 that includes a computer program 404 for executing a computer process on a computing device. An embodiment of the example computer program product 400 is provided using a recordable-type signal bearing medium 402, and may include computer usable code configured for receiving notification of a turbulence event, where the turbulence event is at least one of experienced by a vehicle configured for atmospheric flight or occurs proximal to the vehicle during atmospheric flight. The computer program product may also include a recordable-type signal bearing medium bearing computer usable code configured for distinguishing the turbulence event from a non-turbulence event. The computer program product may include a recordable-type signal bearing medium bearing computer usable code configured for automatically remotely transmitting data regarding the turbulence event to a ground based entity. The computer usable code may be, for example, computer executable and/or logic-implemented instructions. In one implementation, the signal-bearing medium 402 may include a computer-readable medium 406. In one implementation, the signal bearing medium 402 may include a recordable medium 408. In one implementation, the signal bearing medium 402 may include a communications medium 410.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a sensor for coupling with a vehicle configured for atmospheric flight, the sensor for detecting a turbulence event, where the turbulence event is at least one of experienced by the vehicle or occurs proximal to the vehicle during atmospheric flight,
control programming for distinguishing the turbulence event from a non-turbulence event and determining a severity of the turbulence event, wherein the severity of the turbulence event is determined at least partially based on a weight and acceleration of the vehicle; and a transmitter coupled with the sensor, the transmitter for automatically remotely transmitting data regarding the turbulence event and data regarding the severity of the turbulence event to a ground based entity, and wherein the sensor includes an Attitude Heading Reference System (AHRS) configured for measuring acceleration along three orthogonal axes of the vehicle, and the sensor reactively detects the turbulence event at least partially based on acceleration along three orthogonal axes of the vehicle measured utilizing the Attitude Heading Reference System.

2. The system of claim 1, wherein the transmitter is configured for transmitting additional data regarding at least one other event of meteorological significance.

3. The system of claim 1, wherein the transmitter is configured for transmitting additional data associated with the turbulence event, the additional data including at least one of time data, location data, or altitude data.

4. The system of claim 1, wherein at least a portion of the transmitted data is encrypted.

5. The system of claim 1, wherein the transmitted data includes authentication data.

6. The system of claim 1, further comprising control programming for identifying when the turbulence event is a statistical outlier.

7. A system, comprising:
a transmitter for coupling with a sensor, the transmitter for automatically remotely transmitting data regarding a turbulence event to a ground based entity, the sensor coupled with a vehicle configured for atmospheric flight, the sensor for detecting the turbulence event, where the turbulence event is at least one of experienced by the vehicle or occurs proximal to the vehicle during atmospheric flight, and wherein the turbulence event is detected reactively at least partially based on acceleration of the vehicle and weight; and control programming for identifying whether the turbulence event is a statistical outlier, distinguishing the turbulence event from a non-turbulence event~and determining a severity of the turbulence event, wherein the severity of the turbulence event is determined at least partially based on the acceleration of the vehicle and a weight of the vehicle, and wherein the transmitter is further configured for transmitting data regarding the severity of the turbulence event to the ground based entity, and wherein the sensor includes an Attitude Heading Reference System (AHRS) configured for measuring acceleration along three orthogonal axes of the vehicle, and the sensor reactively detects the turbulence event at least partially based on acceleration along three orthogonal axes of the vehicle measured utilizing the Attitude Heading Reference System.

8. The system of claim 7, wherein the transmitter is configured for transmitting additional data regarding at least one other event of meteorological significance.

9. The system of claim 7, wherein the transmitter is configured for transmitting additional data associated with the turbulence event, the additional data including at least one of time data, location data, or altitude data.

10. The system of claim 7, wherein the transmitted data includes authentication data.

11. A method for sensing and dissemination of detected turbulence, comprising: receiving notification of a turbulence event, where the turbulence event is at least one of experienced by a vehicle configured for atmospheric flight or occurs proximal to the vehicle during atmospheric flight, distinguishing the turbulence event from a non-turbulence event; determining a severity of the turbulence event, wherein the severity of the turbulence event is determined at least partially based on a weight of the vehicle and acceleration of the vehicle; and utilizing a transmitter to automatically remotely transmit transmitting data regarding the turbulence event and the severity of the turbulence event to a ground based entity; and wherein the sensor includes an Attitude Heading Reference System (AHRS) configured for measuring acceleration along three orthogonal axes of the vehicle, and the sensor reactively detects the turbulence event at least partially based on acceleration along three orthogonal axes of the vehicle measured utilizing the Attitude Heading Reference System.

12. The method of claim 11, further comprising: transmitting additional data regarding at least one other event of meteorological significance.

13. The method computer-readable device of claim 11, further comprising transmitting additional data associated with the turbulence event, the additional data including at least one of time data, location data, or attitude data.

14. The method computer-readable device of claim 11, wherein at least a portion of the transmitted data is encrypted.

15. The method computer-readable device of claim 11, wherein the transmitted data includes authentication data.

16. The method of claim 11, further comprising: identifying when the turbulence event is a statistical outlier.

* * * * *